United States Patent [19]

Cook

[11] 4,001,473
[45] Jan. 4, 1977

[54] SOUND ATTENUATING STRUCTURAL HONEYCOMB SANDWICH MATERIAL

[75] Inventor: Billy G. Cook, Chula Vista, Calif.

[73] Assignee: Rohr Industries, Inc., Chula Vista, Calif.

[22] Filed: Feb. 19, 1976

[21] Appl. No.: 659,339

[52] U.S. Cl. .............................. 428/116; 52/618; 181/33 G; 428/131

[51] Int. Cl.² .......................................... B32B 3/12

[58] Field of Search ............... 428/72, 73, 116–120, 428/131; 181/33 G, 33 H; 52/615, 618; 156/197

[56] References Cited

UNITED STATES PATENTS

| | | | |
|---|---|---|---|
| 3,070,198 | 12/1962 | Haskell | 29/455 LM X |
| 3,070,480 | 12/1962 | Breiner | 428/116 |
| 3,104,194 | 9/1963 | Zahorski | 428/116 |
| 3,407,110 | 10/1968 | Axelson et al. | 428/117 |
| 3,639,106 | 2/1972 | Yate | 52/451 X |
| 3,673,057 | 6/1972 | Fairbanks | 428/116 |
| 3,709,161 | 1/1973 | Kauffman | 52/618 |
| 3,769,767 | 11/1973 | Scott | 52/615 X |
| 3,821,999 | 7/1974 | Guess et al. | 428/116 X |

*Primary Examiner*—George F. Lesmes
*Assistant Examiner*—Henry F. Epstein
*Attorney, Agent, or Firm*—Patrick J. Schlesinger; Frank D. Gilliam

[57] ABSTRACT

Attenuating structural honeycomb sandwich panels with a cellular core having a portion of the adjacent cell walls removed forming an enlarged cell area positioned between and bonded to two facing sheets. The sheet adjacent the enlarged cell area is imperforate. The other face sheet remote from the enlarged cell area is perforate. Each enlarged cell area communicates to the atmosphere through a single perforation in the perforated sheet.

6 Claims, 4 Drawing Figures

U.S. Patent   Jan. 4, 1977   4,001,473
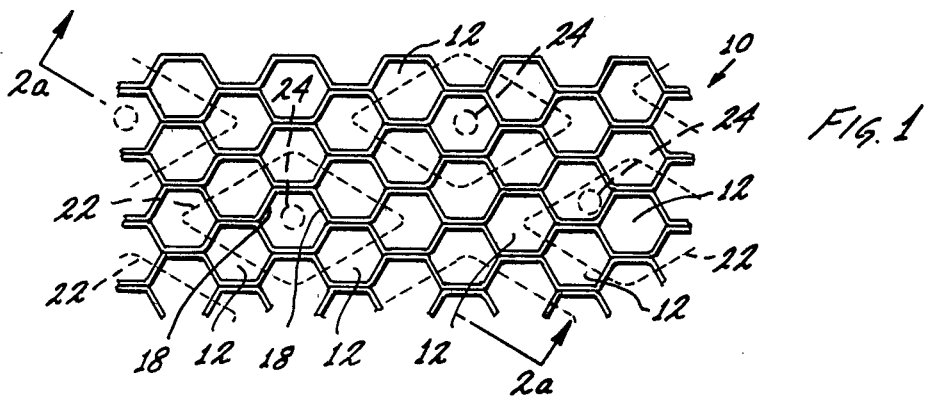
FIG. 1
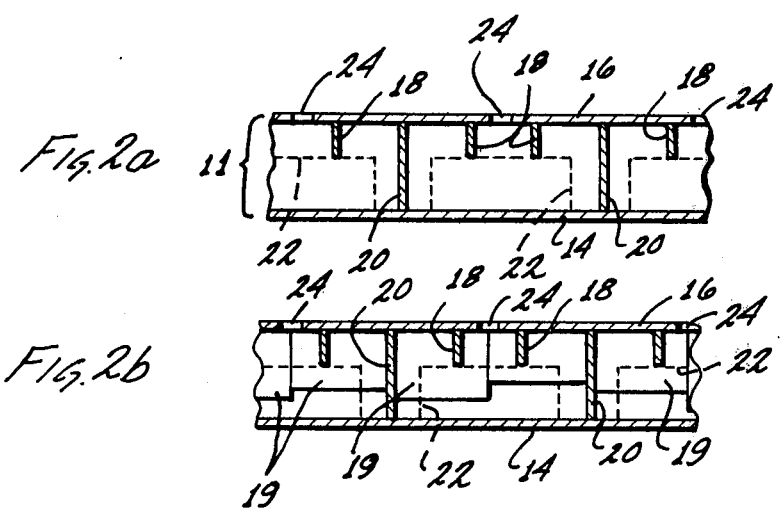
FIG. 2a
FIG. 2b
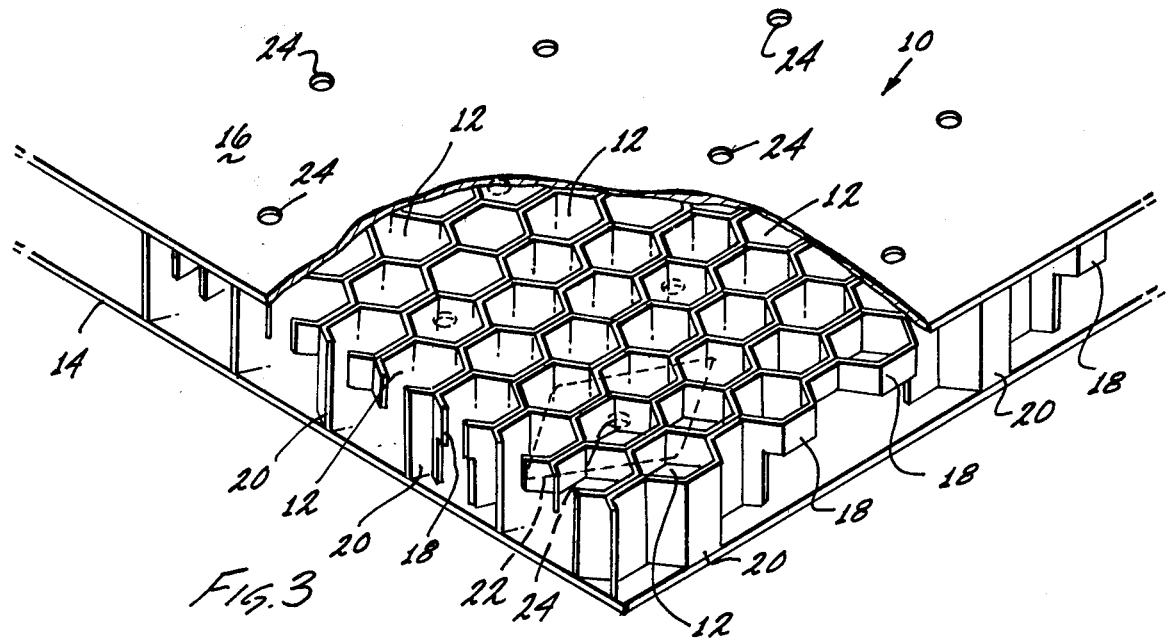
FIG. 3

SOUND ATTENUATING STRUCTURAL HONEYCOMB SANDWICH MATERIAL

BACKGROUND OF THE INVENTION

This invention relates to a new and improved noise attenuating panel and more particularly, to a honeycomb panel having a perforated facing sheet with perforations of a size equal to or smaller than the normal cell size allowing communication between the core enlarged cell area and the atmosphere adjacent to the noise to be attenuated.

In making sound suppressive honeycomb sandwich panels which are exposed to the sound of jet engines and other noise producing mechanisms, it is common practice to provide a honeycomb sandwich structure wherein a central imperforate backing layer of a thin sheet of suitable material is mounted to one face of the core having a multiplicity of cells of equal and uniform size and a facing sheet of thin perforated sound pervious sheet material is applied to the other core surface.

Panels of this type construction, although satisfactory for some frequencies, are found to be an inefficient noise attenuator over a broad range of frequencies customarily encountered in aircraft jet engines.

SUMMARY OF THE INVENTION

It is an object of the invention to provide an improved sound absorption honeycomb sandwich material that includes a resonant cavity larger than the usual honeycomb core cell, an imperforate sheet adjacent the cavities and a perforate sheet with an opening to each cavity area to insure efficient noise attenuation over the broad range of frequencies customarily encountered in aircraft jet engines.

It is a further object of the invention to provide a sound absorption panel having resonating cavities closely representing theoretical helmholtz resonators and thereby providing more efficient sound absorption while providing ease of fabrication and low economic cost.

BRIEF DESCRIPTIONS OF THE DRAWINGS

The foregoing objective and advantages of the invention will be apparent from the following descriptions and accompanying drawings, wherein:

FIG. 1 is a partial plan view of the honeycomb core of the invention.

FIG. 2a is a partial end view of a core with equal length short walls taken along lines 2—2 of FIG. 1.

FIG. 2b is a partial end view of a core with unequal length short walls taken along the same lines as FIG. 2a.

FIG. 3 is a partially cutaway perspective view of the acoustical honeycomb sandwich panel of the invention.

DETAILED DESCRIPTION OF THE INVENTION

The same reference numerals of the various figures denote the identical element or part. Referring now to the drawings in detail: A portion of the honeycomb core material 10 is shown. The sandwich 11 comprises a single honeycomb core 10 having a usual multiplicity of endwise directed cells 12 therein and with their outer facing sheets 14, 16. The core 10 has a portion of cell walls 18 cut away adjacent the facing sheet 14 attachment, see FIGS. 2a and 2b, and surrounding the shorter walls 18 are walls 20 extending the entire core width and enclosing the pocket or cavity 22 formed beneath the short walls 18, shown in FIGS. 1 and 3, in phantom, and in FIGS. 2a and 2b. Although FIGS. 1 and 3 indicate that a portion of nine cells make up the cavity 22, as few as two cells or more than nine cells may be used to practice the invention depending upon the frequency to be attenuated and the size of the core cells. The short walls 18 are shown of substantially equal length. In some applications, they may be of unequal length, as shown by wall 19 of FIG. 2b, and work equally as successful to practice the invention. The walls 18 surrounding the openings 24 in the perforated sheet 16, hereinafter discussed, should be of substantially equal length for best attenuation characteristics. It should be obvious that a plurality of different volume cavities 22 may be employed on the same panel to attenuate a range of specific frequencies.

Facing sheet 16 is perforated and has a number of perforations 24 equal in number to the number of cavities 22 in the core 10. Although the sandwich construction showing of the figures depict the perforation 24 being located adjacent the center of cavity 22, the invention will work equally as well with the perforation off center; because of this feature, precision layout of the perforation 24 is not required.

The core 10 and the facing sheets 14, 16 may be constructed of like or unlike material suitable for the use for which the panel is intended. For use in aircraft jet engine inlet and nacelle structure, for example, such material as aluminum, stainless steel, iron, titanium and the like may be preferred. For other uses of the sandwich panel, such materials as paper, plastic, fiber reinforced plastic, boron reinforced plastic or the like may be preferred because of economic cost. The face sheets 14, 16 are selected of sufficient thickness to carry required loads commonly encountered. The core cell walls 18 may be formed during or after assembly of the core 10 by electro discharge mechanisms, chem milling, cutting or the like of the ribbon making up the core in the areas desired.

When fabricating materials for the sandwich panel structure when its eventual use is compatible with adhesive bonding, the adhesive is selected from a class of systems whose melt viscosity, during the curing process, is sufficiently high so that the adhesive will not flow into the perforations 24 of the perforated sheet 16 by capillary attraction.

While there has been shown and described the fundamental novel features of this invention or applied to the preferred embodiment, it will be understood that various omissions and substitutions and changes in the form and details of the sandwich structure illustrated may be made by those skilled in the art without departing from the spirit of the invention. It is the intention therefore to be limited only by the scope of the following claims and reasonable equivalents thereof.

Having thus described the invention, what is claimed as new and useful and desired to be secured by United States Letters Patent is:

1. A sound attenuating structural honeycomb sandwich material comprising:
   an imperforate face sheet:
   a honeycomb core structure having a multiplicity of adjacent cells, arranged in groups, the cells within said groups have inner walls of a length shorter than the thickness of said core thereby forming enclosed multiple cell areas, said imperforate face sheet being attached to the faying edges of said core adjacent said enclosed multiple cell areas; and a perforated face sheet attached to the faying edges of said core remote from said imperforate face sheet and wherein each perforation of said perforated face sheet communicates only with one of said enclosed multiple cell areas.

2. The invention as defined in claim 1, wherein the shorter length cell walls are substantially equal in length.

3. The invention as defined in claim 1, wherein some of the shorter length cell walls are unequal in length.

4. The invention as defined in claim 1, wherein the shorter walls exposed to the face sheet perforation are substantially equal in length.

5. The invention as defined in claim 2, wherein the shorter walls exposed to the face sheet perforation are substantially equal in length.

6. The invention as defined in claim 1, wherein each enclosed multiple cell area comprises a portion of the combined area of at least two cells.

* * * * *